US005771281A

United States Patent [19]

Batten, Jr.

[11] Patent Number: 5,771,281
[45] Date of Patent: Jun. 23, 1998

[54] SERIAL-PORT POWERED CALLER IDENTIFICATION COMPUTER INTERFACE

[76] Inventor: George Washington Batten, Jr., 3646 Aberdeen Way, Houston, Tex. 77025

[21] Appl. No.: 918,926

[22] Filed: Aug. 26, 1997

Related U.S. Application Data

[63] Continuation of Ser. No. 434,043, May 2, 1995, abandoned.

[51] Int. Cl.⁶ .................................................. H04M 11/00
[52] U.S. Cl. .................................. 379/93.23; 379/93.05; 379/142; 379/201
[58] Field of Search .............................. 379/90.01, 93.01, 379/93.05, 93.06, 93.17, 93.23, 93.26, 93.27, 93.37, 110.01, 142, 201, 354, 372, 376, 413, 441, 442, 387; 375/222, 247, 257; 348/14

[56] References Cited

U.S. PATENT DOCUMENTS

| | | | |
|---|---|---|---|
| 4,439,756 | 3/1984 | Shenoi et al. | 375/247 |
| 4,543,450 | 9/1985 | Brandt . | |
| 4,578,533 | 3/1986 | Pierce . | |
| 4,592,069 | 5/1986 | Redding | 375/257 |
| 4,607,170 | 8/1986 | Wickman | 375/257 |
| 4,607,379 | 8/1986 | Marshall, Jr. et al. | 375/257 |
| 4,689,605 | 8/1987 | Laue | 340/333 |
| 4,772,871 | 9/1988 | Suzuki et al. | 375/247 |
| 5,032,819 | 7/1991 | Sakuragi et al. | 379/413 |
| 5,073,927 | 12/1991 | Grube | 348/14 |
| 5,117,452 | 5/1992 | Callele et al. | 379/98 |
| 5,343,516 | 8/1994 | Callele et al. | 379/98 |
| 5,349,638 | 9/1994 | Pitroda et al. | 379/142 |

FOREIGN PATENT DOCUMENTS 1192644  8/1985  Canada .

OTHER PUBLICATIONS

Special Report –Small Office Computing *Caller ID Goes to Work,* BYTE, Jan. 1995.
Brochure: Dallas Semiconductor –DS1275 Line–Powered RS–232 Transceiver Chip.
Brochure: Motorola Semicontuctor Technical Data –MC145447, *Calling Line Identification (CLID) Receiver with Ring Detector,* Rev 1, 1993.
MHE Classmate™ Model 10 Caller ID Unit brochure, received by PTO Nov. 6, 1991.

*Primary Examiner*—Wing F. Chan
*Attorney, Agent, or Firm*—Michael F. Heim; Conley, Rose & Tayon, PC

[57] ABSTRACT

A computer interface device for answering calls on a telephone line and transmitting a ring signal and caller identification information to the computer. The interface device is powered by the computer's serial port. The interface device operates in one of two modes of operation. In the call receive mode, the device answers calls and transmits caller identification and ring information to the computer. In the dial mode, the computer places calls on the telephone line. The computer controls activation of the interface device's operational modes.

16 Claims, 3 Drawing Sheets

SERIAL-PORT POWERED CALLER IDENTIFICATION COMPUTER INTERFACE

This application is a continuation of application(s) Ser. No. 08/434,043 filed on May 2, 1995 now abandoned.

BACKGROUND OF THE INVENTION

The present invention generally relates to computer system peripheral devices, and more particularly to a telephone interface system for a personal computer. Still more particularly, the present invention relates to a computer powered peripheral device that provides caller identification, dialing, and audible signalling capabilities in an inexpensive package.

Modern computer technology has evolved into a multi-media environment in which the computer functions as the focal point for various information sources and outlets such as hard and floppy disk drives, optical disk drives, video, audio, telephone, and various other devices. Encyclopedic volumes of information can be stored on a single compact disk and interactively accessed through software. Video cameras and recorders can be connected to multi-media computers for digitization and storage of video images. Further, voice communication over the telephone line using a computer is emerging as a new and desirable communication vehicle.

At least one personal computer currently is marketed with a telephone interface. This computer signals the user upon receipt of an incoming call and permits the user to answer the call by toggling a software feature. Voice communication is provided through the computer's microphone and attached speakers. The computer user also can initiate telephone calls using the computer. One problem with this telephone interface is that it is built into the computer and thus cannot be transported to other computers. Moreover, this computer interface currently is not capable of identifying the name or telephone number of the calling party.

Some local telephone companies offer a service (commonly referred to as Caller ID) in which the caller's identification (i.e. name and/or telephone number) is transmitted over the telephone line with the standard ring and voice signals. A device connected to the receiving party's telephone decodes the telephone signal to extract the caller's telephone number and/or name and displays this identification information on a small screen. Hence, the receiving party can ascertain the identification of the caller before answering the call. Caller ID is a member of the CLASS (custom local-area signaling services) family of telephone services offered by local telephone companies for a monthly fee.

Several patents have addressed the need for a stand-alone device that can provide an interface between a telephone line and a serial port of a computer. Such a device could be used on any computer having a compatible serial port. The predominance of computer serial ports comply with the widely-used EIA RS-232-C serial data port standard (hereinafter simply "RS-232"). Most standard external computer interface arrangements, however, do not provide connections intended for powering peripheral devices connected to the port. For many applications the amount of power needed by the peripheral device is relatively small, and thus inconvenient to supply the needed power from batteries internal to the device or via an external power supply. For these reasons, it is advantageous to derive the required power from the signal lines of the computer interface.

There have been several attempts made to develop a commercially viable telephone interface device for a personal computer. U.S. Pat. No. 5,117,452, for example, discloses an interface device that provides connections to a telephone line and a computer RS-232 serial port. Caller identification information is extracted from the telephone signal and formatted for input into the computer through the RS-232 port. Power to operate the device is obtained from a relatively complex circuit in the interface device, which circuit develops the power from a combination of the telephone and RS-232 signals. This power circuit generates positive and negative voltage levels to supply the device's operational power needs. The complexity of the power circuit, including power inputs from both the telephone line and the computer's RS-232 port, however, increases the cost and size of this device, limiting its commercial viability.

A more versatile device for performing the caller identification function is discussed in U.S. Pat. No. 5,349,638. In this patent, the caller identification information extracted from the telephone line can be presented visually on a display, audibly through a speaker, and digitally to a computer through an RS-232 interface. The source of the device's operating power and the technique for conditioning that power are not disclosed. It does not appear, however, that operating power is provided through its RS-232 interface.

Other patents disclose computer peripheral devices that obtain power from a computer's RS-232 interface, but do not perform caller identification. Canadian Patent No. 1,192,644 teaches a method for powering a data communications apparatus from RS-232 signal lines. Communication and control RS-232 signals referenced to signal ground are rectified through diodes and applied to capacitors to provide positive and negative voltages for powering the data communications set. The RS-232 signals may be switched continuously between positive and negative voltage levels to generate a pulsed alternating current (AC) voltage for rectification. It is not clear if all of the power required by the data communications set can be derived from the RS-232 signals, because the invention provides the capability to accept secondary power from an external AC transformer.

U.S. Pat. No. 4,543,450 discloses a modem contained in a structure with an integral RS-232 connector for connection to a computer's serial port. One pin of the RS-232 interface connector supplies power to the modem from an appropriate power source in the computer. This arrangement disadvantageously requires nonstandard connections for the interface connector.

In yet another invention, Dallas Semiconductor Corp.'s DS1275 Line Powered Transceiver uses power derived from the Transmit Data (TD) signal of an RS-232 interface to reduce battery drain in a peripheral device. This device, however, does not produce signals that comply with the EIA RS-232-C standard.

It is apparent from the prior art that a simple device that can connect a telephone line to a computer, provide caller identification information to the computer, and obtain operational power from the computer is needed. The device preferably should allow a computer user to place outgoing calls and should provide audible signalling to alert the user that a call is being processed. The caller identification computer interface devices disclosed in the prior art are relatively complex and costly to produce. An interface device based on a simple design, including obtaining power exclusively from the computer, would be less expensive to manufacture and consume less power, making the device much more attractive to individuals and small businesses. Such a device and accompanying software would be further simplified if the RS-232 signals used to generate the device's operational power could remain constant and not be continuously switched to produce an AC power source. Additionally, for certain applications the device should be able to sense signals indicating whether there is still a connection to a remote telephone. Finally, simplicity also would be advanced by providing a simple mechanism through which the device's operational modes could be switched between receiving calls and placing calls.

SUMMARY

The present invention solves the shortcomings and deficiencies of the prior art by constructing a serial-port powered caller identification computer interface device to provide an interface between a telephone line and a computer for transmitting caller identification information decoded from the telephone line to the computer. Operational power for the interface device is derived solely from the computer's serial port. The interface device allows two-way communication between the telephone line and the computer through two modes of operation. In the call receive mode, the interface device answers calls, decodes caller identification information from the telephone line, and transmits a ring signal and the caller identification to the computer. The computer, in turn, may perform a variety of actions in response to the receipt of this information including storing the information, retrieving related stored information, and/or displaying the information on the computer screen. In the dial mode, the interface device allows the computer to initiate a call or redirect an incoming call through the telephone network to another telephone station. Also, the interface device senses the telephone line loop current and transmits a signal reflective of the magnitude of the loop current to the computer. The computer can use this signal to determine the status of the telephone network connection.

BRIEF DESCRIPTION OF THE DRAWINGS

Other objects and advantages of the invention will become apparent upon reading the following detailed description and upon reference to the accompanying drawings in which:

FIG. 4 shows a block diagram of a preferred method for generating audible signals.

Figure 1:
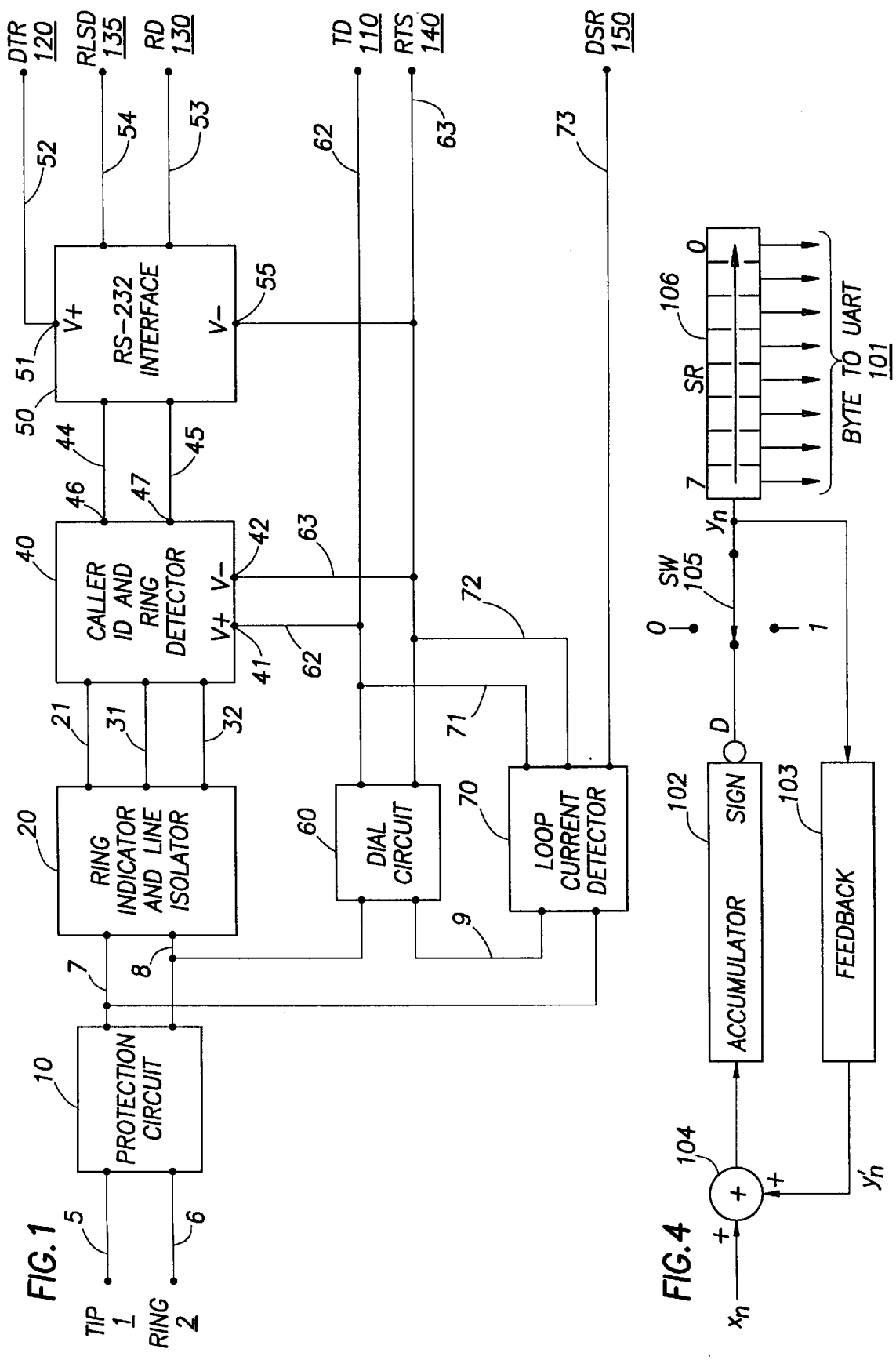
FIG. 1 shows a block diagram of the serial port-powered caller identification computer interface constructed in accordance with the preferred embodiment.

While the invention is susceptible to various modifications and alternative forms, specific embodiments thereof are shown by way of example in the drawings and will herein be described in detail. The drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Referring now to FIG. 1, the interface device constructed in accordance with the preferred embodiment generally comprises a Protection Circuit 10, a Ring Indicator and Line Isolator 20, a Caller ID and Ring Detector 40, an RS-232 Interface 50, a Dial Circuit 60 and a Loop Current Detector 70. A typical telephone line includes a Tip signal 1 and a Ring signal 2. The Tip signal 1 and Ring signal 2 couple to the Protection Circuit 10 via conductors 5 and 6, respectively.

The Protection Circuit 10 couples the telephone line signals Tip 1 and Ring 2 to the Ring Indicator and Line Isolator 20, Dial Circuit 60, and Loop Current Detector 70. The Tip signal 1 is coupled through conductor 7 and the Ring signal 2 is coupled through conductor 8 as shown in FIG. 1. The dialing loop current circuit is completed by conductor 9 which couples the Loop Current Detector 70 to the Dial Circuit 60. The output signals of the Ring Indicator and Line Isolator 20 couple to the Caller ID and Ring Detector 40 via conductors 21, 31, and 32. Operating power for the Caller ID and Ring Detector 40 is provided by the RS-232 signals transmit data (TD) 110 and request to send (RTS) 140 by conductors 62 and 63, respectively. The TD signal 110 provides the positive operating voltage to the V+ terminal 41 of the Caller ID and Ring Detector 40 and the RTS signal 140 provides the negative operating voltage to the V− terminal 42 of the Caller ID and Ring Detector 40. The output signals of the Caller ID and Ring Detector 40 connect to the RS-232 Interface 50. Positive operating power for the RS-232 Interface 50 is provided by the data terminal ready signal (DTR) 120 via conductor 52 to the V+ terminal 51 of the RS-232 Interface 50. Negative operating voltage is provided by the RTS signal 140 to the V− terminal 55 of the RS-232 Interface 50. The output signals of the RS-232 Interface 50 couple to the RS-232 signals read data (RD) 130 and receive line signal detector (RLSD) 135 over conductors 53 and 54, respectively.

Power and control signals for the Dial Circuit 60 are provided by the TD signal 110 over conductor 62 and the RTS signal 140 over conductor 63. In the preferred embodiment, the TD signal 110 serves two purposes. The TD signal 110 provides both the negative operating voltage and the active control signal for the Dial Circuit 60. The Loop Current Detector 70 connects to the TD signal and the RTS signal over conductors 71 and 72, respectively. The output signal of the Loop Current Detector 70 couples to the RS-232 data set ready (DSR) signal 150 through conductor 73.

The operation of the interface device as depicted in FIG. 1 now will be described. The Protection circuit 10 provides overcurrent protection and surge suppression to protect the interface device from excessive current and voltage levels that may be present on the telephone line conductors 5 and 6. Ring Indicator and Line Isolator 20 provides additional protection by limiting the amount of current and eliminating the direct current (DC) voltage component of the telephone signal on conductors 5 and 6.

The interface device generally operates in one of two modes—the Call Receive Mode and the Dial Mode. In the Call Receive Mode, the system waits for calls, recognizes incoming calls upon detection of a ring signal on the telephone signal conductors 5 and 6, extracts caller identification information from the telephone line, and transmits signals indicative of the caller identification information and the ring signal to the computer through the computer's RS-232 port. The caller identification information usually comprises the caller's name and/or telephone number. The Dial Mode of operation allows the initiating of outgoing calls from the computer, through the interface device, and on to the telephone line. During the Dial Mode, the computer can also detect signals indicating the state of the network connection.

The TD signal 110 and the RTS signal 140, produced by the computer and controlled through computer software, control activation of the operational modes. The Call Receive Mode is activated when the TD signal is asserted as a positive voltage, which commonly is referred to as the Space condition in the EIA RS-232-C standard while the RTS signal is at a negative voltage, referred to as Mark in the RS-232 standard. The Call Receive Mode switches to the Dial Mode upon reversal of the polarity of the TD and the RTS signals so that the TD signal is in the Mark or negative voltage state and the RTS signal is in the Space or positive voltage state. The computer's software controls the polarity of the RTS and the TD signals and thus the mode of operation. Advantageously, this scheme for switching operational modes allows the TD and the RTS signals to remain fixed (except for information-carrying pulses) during operation of each mode, making it possible to use these signals to provide operational power to the interface device. This scheme also simplifies the implementing computer software because there is no requirement that the TD and the RTS signals continually change states to provide a pulsed alternating current as is required in some of the prior art.

When in the Call Receive Mode, the circuitry comprising the Ring Indicator and Line Isolator 20, the Caller ID and Ring Detector 40, and the RS-232 Interface 50 is operational. The Ring Indicator and Line Isolator 20 preferably includes only passive circuit components and thus requires no operational power. The Caller ID and Ring Detector 40 and RS-232 Interface 50 include active circuit components and thus require operational power as provided by the TD signal 110, the RTS signal 140, and the DTR signal 120.

The Ring Indicator and Line Isolator 20 generates voltage pulses in response to detection of a ringing signal (i.e., incoming call) on Ring signal 2. A typical telephone line ringing signal is a high voltage, low frequency signal. Ring Indicator and Line Isolator 20 translates the ringing signal to a stream of digital pulses on conductor 21, which pulses are compatible with the Caller ID and Ring Detector 40. In response to receipt of a stream of pulses indicating an incoming call, Caller ID and Ring Detector 40 generates a single voltage pulse on its output terminal 46 which is coupled through the RS-232 Interface to RLSD signal 135 of the computer's serial port. As such, the computer can be made aware of the presence of an incoming call.

The RLSD signal is used as an input signal to the computer. The RLSD signal is used to provide the computer with an indication of a ringing signal, rather than the more conventional RS-232 ring indicator (RI) pin, because the RLSD signal generates an interrupt to the computer's microprocessor on both the falling and rising edges of pulses. Since the falling and rising edges of pulses on conductor 54 approximately coincide with the beginning and ending of the telephone line ring signal, the computer thus can be made aware of the beginning and ending of the telephone ring signal. Conversely, if the signal were transmitted to the computer through the RS-232 RI pin, the computer could only be aware of the beginning of the telephone ring signal because the RI signal generates a computer interrupt either in response to a falling edge or a rising edge of a voltage pulse on signal RI, but not both. The RI pin is useful if the computer software is designed to detect the beginning (or ending) of a ring signal, but inconvenient if both the beginning and ending of ringing are to be detected. In particular, using the RLSD signal instead of the RI signal is advantageous when it is desired to have the computer system distinguish between different ringing patterns, such as are delivered under the so-called "distinctive ringing" feature offered by some telephone services such as CLASS.

The Caller ID and Ring Detector 40 also extracts caller identification information from the telephone line. The signal on conductor 31 is indicative of the Tip signal 1 and the signal on conductor 32 is indicative of the Ring signal 2. Conductors 31 and 32, therefore, substantially transmit the Tip and Ring signals to the Caller ID and Ring Detector 40 which extracts the caller identification information and places that information on its output terminal 47. The output caller identification signal on terminal 47 of the Caller ID and Ring Detector 40 is coupled through the RS-232 Interface 50, through conductor 53, and to the RD signal 130 of the computer's serial port. As such, the computer can be made aware of the presence of an incoming call by processing interrupts generated by the RLSD signal 135 and can obtain caller identification information by examination of the RD signal 130.

The RS-232 Interface 50 makes the signals present on conductors 44 and 45 compatible with the RS-232 signals RD 130 and RLSD 135. The compatibility is necessary for the computer to obtain and interpret the caller identification information and ring signal.

In the Dial Mode, with the RTS signal 140 at a positive voltage with respect to the TD signal 110, the Dial Circuit 60 and Loop Current Detector 70 are operational, while the Ring Indicator and Line Isolator 20, Caller ID and Ring Detector 40, and RS-232 Interface 50 generally are non-operational. As will be discussed below, one component of the Ring Indicator and Line Isolator 20 is operational during the Dial Mode. The voltage level of the DTR signal 120 is irrelevant for operation of the Dial Mode, except that it should be kept high to reduce loading of the RTS signal. By maintaining the RTS signal at a positive voltage level and toggling the TD signal between positive and negative voltage levels, dial pulses can be created by the computer and transmitted through the Dial Circuit 60 to conductors 7, 8 and 9, and to the telephone line conductors 5 and 6 to effect pulse dialing.

Figure 2:
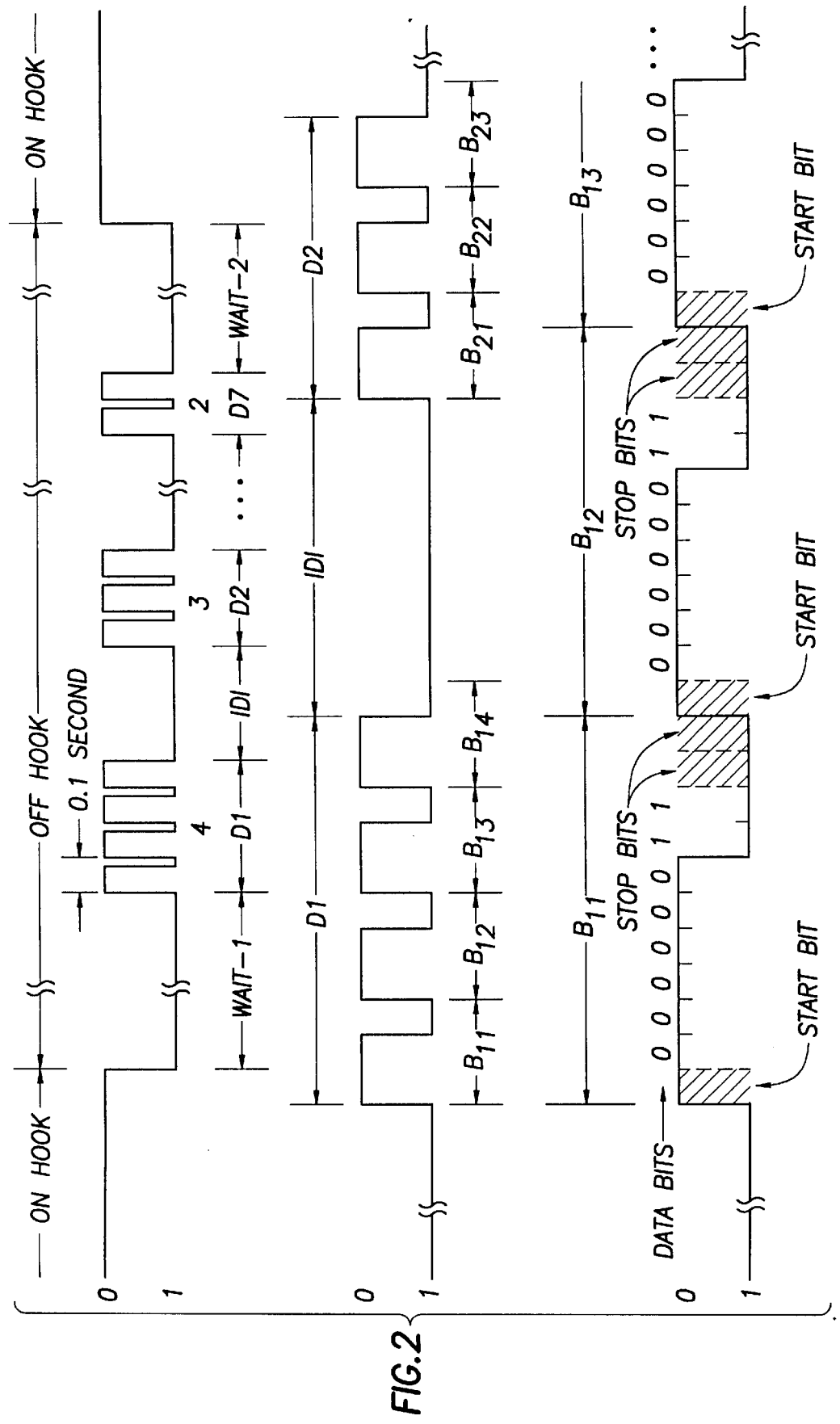
FIG. 2 shows several timing diagrams demonstrative of pulse dialing.

Referring now to FIG. 2, the methodology and protocol for effecting pulse dialing is shown in a series of timing diagrams. These timing diagrams show the voltage on the TD signal 110. The timing of these pulses generally complies with United States telephone standards.

In pulse dialing the telephone set generates a number of pulses corresponding to the number dialed. Thus, one pulse is generated upon dialing the number "1," two pulses are generated upon dialing the number "2," and so forth. The upper part of FIG. 2 shows part of a dialing sequence in which the first two and last digits are 4, 3, and 2, respectively. As shown, four pulses are generated to dial the four, three pulses for the three, and two pulses for the two. These groups of pulses, represented as D1, D2, and D7, are generated by the TD signal 110 which toggles between the "0" state and the "1" state. The "0" state corresponds to a high or positive voltage and "1" corresponds to a low or negative voltage. A pulse is generated by toggling the TD signal from the "1" state to the "0" state and back to the "1" state in approximately 0.1 seconds. The end of one dialed number is demarcated from the beginning of the next dialed number by maintaining the TD signal at the "1" state following the last serial pulse of a dialed number for a predetermined idle period shown as the interdigital interval (IDI) in FIG. 2. The preferable IDI time period is specified in commonly known United States telephone standards.

To initiate dialing, the telephone loop must be taken off-hook from the on-hook state. While on-hook, the TD signal is set to the "0" state. The dialing sequence begins when the software sets the TD signal to the "1" state, thereby taking the telephone loop off-hook. After an appropriate time, indicated by the Wait-I time interval which allows the telephone network to become ready for dialing, the software, by toggling the TD signal, causes the system to place the dial pulses on the telephone line. The dialing sequence ends with an interval (Wait-2) during which the loop is off-hook (i.e., TD is in the "1" state). The Wait-2 time interval allows the user to pick up an associated telephone after dialing has been completed.

The middle part of FIG. 2 shows an expanded view of the part of the top part of FIG. 2 between the Wait-I time period and the end of the D2 group of pulses. The bottom part of the figure further expands three of the pulses represented as B11, B12, and B13 from the middle part of FIG. 2. For each pulse, the software passes one byte (8 bits) of information to the computer's serial port, which then transmits each byte using traditional serial communications techniques in the intervals indicated by B11, B12, B13, and B14 for D1. In each of these intervals, the computer's serial port also sends a start bit (a high level on the TD signal for one bit time interval) and two stop bits (a low level of the TD signal) in conjunction with the eight data bits. The terms bit, byte, start bit, stop bit, and data bit will be familiar to one of ordinary skill in the art and are used in the same sense as those terms normally are used. FIG. 2 shows that one start bit, eight data bits and two stop bits preferably are transmitted for a total of eleven bits per dial pulse. The particular data byte transmitted is the hexadecimal value "C0." With these start, data, and stop bits transmitted, the TD signal will be in the "0" state during 7 bit times including the start bit and data bit times one through 6, and will be in the "1" state during data bit times seven and eight and during the two stop bits. As such, the TD signal will be in the "0" state for $7/11$ or 63.6% of the time duration of each dial pulse. This fractional time complies with the U.S. and Canadian telephone network standards. The fraction of time that the pulse signal is in the "0" state, as described above, commonly is called the break fraction.

The transmission rate can be set to a standard rate of 110 bits per second to achieve ten pulses per second as required by most telephone networks. For networks which require a break fraction of $2/3$ or 66.7%, the computer's serial port can be set for seven data bits, one stop bit, and a rate of 90 bits per second. In this case, the transmitted data byte is the hexadecimal value 60. If the computer's serial port cannot transmit at the rate of 90 bits per second, one of ordinary skill in the art will recognize that other combinations can be used.

The advantages of this method of generating the pulses are that application software is simplified, computational overhead in managing the interface operation is minimal, and accurately timed pulses are produced by the built-in features of the serial port circuitry. These advantages assume that the application software passes the correct number of bytes to the computer's system software and that the system software interacts with the serial port through the computer's interrupt system, allowing the computer to operate in a multi-processing fashion.

While in the Dial Mode the Loop Current Detector 70 determines whether a loop current is present on the telephone conductors 5 and 6. Loop current pulses (sometimes in the form of a current reversal) are used for signaling network conditions, such as disconnection of the remote telephone. The output signal of the Loop Current Detector 70 is transmitted to the computer's serial port through the DSR signal 150 on conductor 73. This allows the computer to monitor the state of the telephone network by following the state of the DSR signal 150. In particular, this allows the computer to determine when to place on hook a call that was forwarded using the CLASS three-way calling feature.

Figure 3:
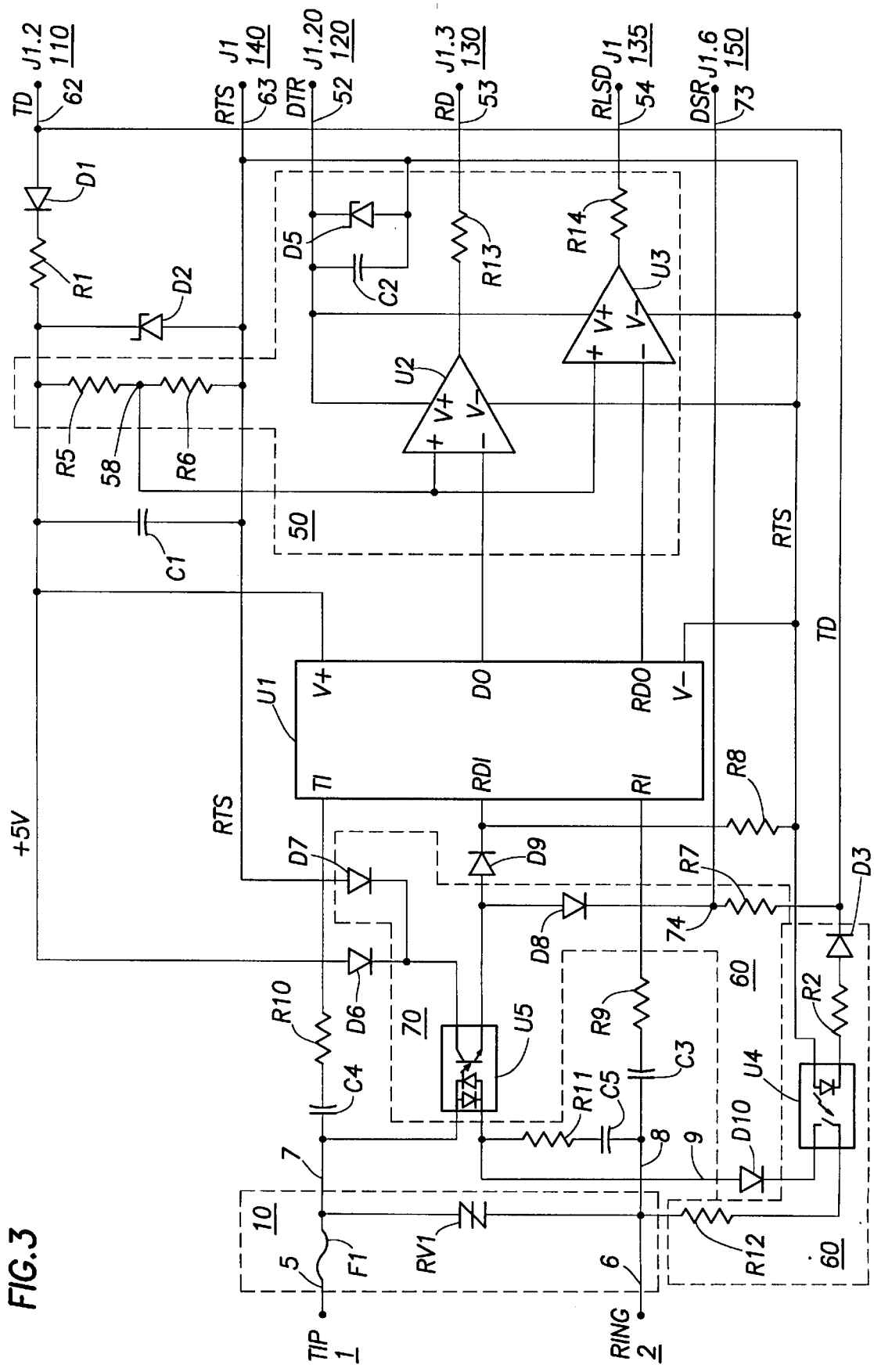
FIG. 3 is a detailed electrical schematic diagram of the preferred embodiment of the caller identification interface of FIG. 1.

Referring now to FIG. 3, the electrical components comprising the Protection Circuit 10, Ring Indicator and Line Isolator 20, Caller ID and Ring Detector 40, RS-232 Interface 50, Dial Circuit 60, and Loop Current Detector 70 are shown in more detail. Some, but not all, of the blocks from FIG. 1 are not outlined in FIG. 3 in dashed lines. The Ring Indicator and Line Isolator 20 and the Caller ID and Ring Detector 40 are not outlined to avoid confusion. The Protection Circuit 10 includes a Fuse F1 and a voltage surge limiter RV1. The Ring Indicator and Line Isolator 20 includes an optoisolator U5, resistors R9, R10, and R11, and capacitors C3, C4, and C5. The Caller ID and Ring Detector 40 includes a Calling Line Identification Receiver with Ring Detector (CLID) U1, diodes D1, D6 and D9, a zener diode D2, resistors R1 and R8, and a capacitor C1. In one preferred embodiment, the CLID U1 comprises a Motorola MC145447, but other components alternatively may be used. The RS-232 Interface 50 includes voltage comparators U2 and U3, resistors R5, R6, R13 and R14, a capacitor C2, and a zener diode D5. The Dial Circuit 60 includes an optical switch U4, resistors R2 and R12, and diode D3. Finally, the Loop Current Detector 70 includes diodes D7, D8 and D10, a resistor R7, and optoisolator U5. As will be explained below, the optoisolator U5 serves two purposes as it is used in both the Ring Indicator and Line Isolator circuit 20 and the Loop Current Detector circuit 70.

The Tip signal 1 on conductor 5 connects through fuse F1 to conductor 7. Voltage surge limiter RV1 connects between conductor 7 and the Ring signal 2 on conductor 6. The series combination of capacitor C4 and R10 connects between conductor 7 and the Tip Input (TI) pin of CLID U1. Likewise, the series combination of C3 and R9 connects between the Ring signal 2 on conductors 6 and 8, and the Ring Input (RI) pin of CLID U1. One input of the AC-input optoisolator U5 connects to conductor 7 and the other input connects to conductor 9. The series combination of C5 and R11 connects between conductor 8 and conductor 9. The emitter of optoisolator U5 connects to the anodes of diodes D8 and D9, and the collector of U5 connects to the cathodes of diodes D6 and D7. One terminal of resistor R8 connects to the RTS signal 140 on conductor 63. The other terminal of R8 connects to the cathode of diode D9 and to the Ring Detect Input (RDI) pin of CLID U1. If the Motorola MC145447 part is used as CLID U1, the RDI input pin of CLID U1 generally comprises two input pins: RDI1 and RDI2. One of ordinary skill in the art will recognize that these two input pins should be connected together to be used as pin RDI.

Operating power for CLID U1 is developed from the TD signal 110 on conductor 62. The TD signal 110 connects to the anode of diode D1, and the cathode of diode D1 connects to one terminal of resistor R1. Voltage regulator zener diode D2 connects between the opposite terminal of resistor R1 and the RTS signal 140 on conductor 63 with the anode of zener diode D2 connected to conductor 63. Capacitor C1 connects in parallel across zener diode D2 to provide filtering. The signal on the cathode of zener diode D2 represents a +5 V regulated voltage level. This +5 V signal is applied to the positive voltage input pin V+ of CLID U1 to provide CLID U1 with operating voltage. The RTS signal on conductor 63 connects to the negative input voltage pin V− of CLID U1. The +5 V regulated voltage on the cathode of zener diode D2 also connects to the anode of diode D6.

The RTS signal 140 also connects via conductor 63 to the anode diode D7. The cathode of diode D8 connects to the TD signal 110 on conductor 62 through resistor R7. The RTS signal 140 on conductor 63 connects to the light emitting diode (LED) anode input terminal of optical switch U4, and the LED cathode input of optical switch U4 connects to the anode of diode D3 through resistor R2. The cathode of diode D3 connects to the TD signal 110 on conductor 62. One output pin of optical switch U4 connects to conductor 9 through diode D10 whose anode is connected to conductor 9, and the other output pin of optical switch U4 connects to the Tip signal 2 through resistor R12.

Voltage comparators U2 and U3 include positive input pin + and negative input pin −. A reference voltage source 58 connects to both positive + pins. Reference voltage source 58 is provided by the voltage divider comprising resistors R5 and R6 connected in series between the cathode of zener diode D2 and the RTS signal on conductor 63. One of ordinary skill in the art, however, will recognize that there are other circuit implementations for generating a reference voltage source besides the voltage divider resistor combination shown in FIG. 3. The Data Output (DO) pin of CLID U1 connects to the negative input pin − of comparator U2, and the Ring Detect Output (RDO) pin of CLID U1 connects to the negative input pin − of comparator U3. The output pin of comparator U2 connects through resistor R13 to the RD signal 130 on conductor 53. The output pin of comparator U3 connects through resistor R14 to the RLSD signal 135 on conductor 54. Capacitor C2 connects between the DTR signal on conductor 52 and the RTS signal 140 on conductor 63. Zener diode D5 connects in parallel across capacitor C2 with the anode of zener diode D5 connected to the RTS signal 140. The DTR signal 120 on conductor 52 connects to the positive operating voltage pin V+ of both comparators, and the RTS signal on conductor 63 connects to the negative operating voltage pin V− of both comparators. As such, the voltage difference between the DTR and RTS signals provides the operating power for comparators U2 and U3.

Power-on and oscillator circuits for CLID U1 are not shown in FIG. 3. One of ordinary skill in the art, however, will recognize that commonly known power-on and oscillator circuits can be used with CLID U1. Several examples of such circuits are shown in the manufacturer's technical data sheet for the Motorola MC145447.

Referring still to FIG. 3, operation of the interface device in the Call Receive Mode will now be described. Fuse F1 and voltage surge limiter RV1 form a conventional telephone interface circuit that provides protection to the interface device from differential voltage surges and powerline cross conditions. Accordingly, fuse F1 and voltage surge limiter RV1 preferably are used during both the Call Receive and Dial modes of operation.

Focusing on the Ring Indicator and Line Isolator 20, capacitor C5, resistor R11, and optoisolator U5 comprise a ring signal detector circuit. This circuit, along with high voltage capacitors C3 and C4, electrically isolate the telephone line from the computer interface and the computer by providing protection from common-mode voltage surges that may be present on the telephone line. The ring signal detector circuit also provides a signal indicative of the telephone line ring signal through diode D9 to CLID U1 input RDI. As described above, the telephone line ringing generally comprises a high voltage, low frequency signal. The ringing signal illuminates LEDs in the input of the optoisolator causing the optoisolator's output transistor switch to open and close. Each time the transistor closes, current conducts from the serial port's TD signal, through diode D1, through resistor R1, through diode D6, through the transistor switch, through diode D9, through resistor R8, and back to the computer through signal RTS. The voltage that is developed across resistor R8 generally comprises a digital pulse train that also is present on the RDI input pin of CLID U1. By examining input RDI for a digital pulse train, CLID U1 can determine when an incoming ringing signal is present on the telephone line. CLID U1 also processes the RDI input signal to eliminate spurious signals or noise.

In response to detection of a ringing signal (i.e., an incoming call on the telephone line 15), CLID U1 produces ringing and identification information on its output signals DO and RDO. CLID U1 decodes the differential signal across the TI and RI input pins of CLID U1 to extract the call identification information. The CLID U1 DO output signal generally includes call identification information, and the RDO output signal generally includes an indication that a ring has been detected on the telephone line. A voltage pulse approximately coinciding with the beginning and ending of the telephone line's ring signal preferably is placed on the RDO output signal by CLID U1 to indicate to the computer the presence of a ring. The information contained on the DO and RDO signals is transmitted to the computer through comparators U2 and U3 and current limiting resistors R13 and R14 as shown in FIG. 3.

The RDO ring signal passes through comparator U3 and resistor R14 to the RS-232 port signal RLSD 135 on conductor 54 to provide an indication to the computer of the presence of an incoming call. The RLSD signal preferably is used rather than the more conventional RS-232 ring indicator (RI) pin because the RLSD signal generates an interrupt to the computer's microprocessor on both the falling and rising edges of CLID U1's RDO pulse. Since the falling and rising edges of the RDO pulse approximately coincide with the beginning and ending of the telephone line ring signal, the computer thus can be made aware of the beginning and ending of the telephone ring signal. Conversely, if the CLID U1 RDO signal were transmitted to the computer through the RS-232 RI pin, the computer could only be aware of the beginning of the telephone ring signal because the RI signal generates a computer interrupt either in response to a falling edge or a rising edge of a voltage pulse waveform on signal RI, but not both. The RI pin is useful if the computer software is designed to detect the beginning (or ending) of a ring signal, but disadvantageous if both the beginning and ending of ringing are to be detected. In particular, using the RLSD signal instead of the RI signal is advantageous when it is desired to have the computer system distinguish between different ringing patterns, such as are delivered under the so-called "distinctive ringing" feature offered by some telephone services.

Any information, such as caller identification, that is present on the telephone line is detected and converted to logic signals by CLID U1 and provided as the DO signal of CLID U1. The technical data sheet for the Motorola MC145447 details the operation of the CLID U1 for extracting the caller identification information from the telephone line and, thus, is incorporated herein by reference for that purpose.

The RS-232 Interface 50 of FIG. 1 ensures compatibility of the CLID output signals DO and RD with the computer's RS-232 port by shifting the voltage levels of DO and RDO to levels that comply with the RS-232 standard. This voltage shifting is accomplished by comparison of the DO and RDO voltage levels to reference voltages present on the positive input pins of both comparators. If, for example, the voltage level of the DO signal is greater than reference voltage on U2's positive input pin, then the output signal of comparator U2 is forced to approach the negative operating voltage V− of comparator U2, wherein the negative operating voltage V− is provided by the RS-232 RTS signal. Conversely, if the voltage level of the DO signal is less than reference voltage, then the output signal of comparator U2 is forced to approach comparator U2's positive operating voltage V+ which is provided by the RS-232 signal DTR. Because the RTS and the DTR signals are standard RS-232 signals, and the output signal of comparator U2 approximates these signals, the comparator's output signal is compatible with the RS-232 standard. Comparator U3 similarly shifts CLID U1 output signal RDO to be compatible with the RS-232 standard. Diode D5 regulates the voltage level of the operating power provided to comparators U2 and U3 by the DTR signal and capacitor C2 filters the comparators' operating voltage.

Operating power for the CLID U1 is derived from signal TD 110. This power is developed through resistor R1 and rectifying diode D1. Zener diode D2 provides voltage regulation to maintain a constant voltage power source. In the preferred embodiment, zener diode D2 comprises a +5 V regulator. One of ordinary skill in the art, however, will recognize that other voltage levels may provide adequate power levels. Capacitor C1 filters the regulated power signal to remove unwanted noise. Advantageously, only one voltage level is required for proper operation of the circuitry.

The RTS signal line is maintained at a negative voltage level during the Call Receive Mode, so the Dial Circuit 60 is inactive. In the Call Receive Mode, therefore, no current flows into optical switch U4. As such, the optical switch remains open and has no effect on the operation of the telephone line or Call Receive Mode functionality.

The invention can be switched from the Call Receive Mode to the Dial mode by reversing the polarity of the TD and RTS signals. As described, polarity reversal is accomplished through the use of computer software. Referring still to FIG. 3, the Dial Mode is established by setting the RTS signal 140 on conductor 63 to a positive voltage state. The voltage polarity of the DTR signal should be kept high in the Dial Mode to reduce loading of the RTS signal. Because the TD signal 110 is never more positive than the RTS signal 140 during Dial Mode operation, no operating power is developed by resistor R1 and diode D1. Hence, CLID U1 is inactive during Dial Mode operation.

The following paragraphs describe operation of the system during the Dial Mode. When the RTS signal is placed in the positive voltage state by the computer, current flows into the input of optical switch U4 causing the switch to close when the TD signal is placed in the negative voltage state. The switch functionally is equivalent to a telephone hookswitch, providing the computer, through software, with control of certain network functions. The line can be taken off hook and "pulse dialing" can be achieved by pulsing the TD signal at an appropriate rate. Furthermore, the Dial Mode of operation can be used for automatic dialing by the computer. The Dial Mode also can be used to forward calls through a multi-step three-way calling arrangement. In step one, the computer software controls the state of the TD signal to answer the incoming call by taking the line off-hook. In step two, the computer issues a "flash" (i.e., placing the telephone on-hook for approximately one-half second) so that the telephone network controller will put the incoming call on hold and establish a connection for dialing. In step three, a destination number to which the holding call will be forwarded is dialed. In step four, the computer issues another flash to connect the incoming call to the dialed line. Finally, the computer puts the line on-hook after some predetermined condition (such as expiration of a specified period of time) has occurred.

As described above, the Loop Current Detector 70 senses loop current while the interface device operates in the Dial Mode. Assume that the RTS signal 140 and the TD signal 110 are in the positive and negative voltage states, respectively. Then optical switch U5 will be closed. Under this condition and the condition that the telephone line has the usual polarity, with the Tip signal 1 more positive than the Ring signal 2, a forward direct current (DC) line current will flow from the telephone line through conductor 5, through fuse F1, through one of the input LEDs comprising the input circuitry of optoisolator U5, through diode D10, through the semiconductor switch of optical switch U4, through resistor R12, and back to the telephone line through conductor 6. In this case the output transistor switch in optoisolator U5 will be closed, and current will flow from the RTS pin on the RS-232 serial port, through diode D7, through the transistor switch in optoisolator U5, through diode D8, through resistor R7 to return to the TD pin on the serial port. This current produces a voltage drop across resistor R7, thereby raising the voltage at terminal 74 between diode D8 and resistor R7. The voltage at terminal 74 will approach the positive voltage of the RTS signal 140. If, on the other hand, no current flows in the first-described circuit, then the transistor switch in optoisolator U5 will be open, and no current will flow in the circuit including resistor R7. In this case, the voltage at terminal 74 will be the same as the negative voltage of the TD signal 110 on conductor 62. One of ordinary skill in the art will recognize that the low-level AC communication signals which are on the telephone line will provide some current through the series combination of resistor R1 and C5, but that these currents are negligible in comparison to the DC loop current, so they have no effect on the voltage at terminal 74.

Thus, under the conditions assumed, the voltage at terminal 74 is indicative of the state of the forward DC current in the telephone loop. The voltage at terminal 74 is monitored by the computer through the DSR signal 150 on conductor 73. Normal forward current flow produces a high voltage, placing the DSR signal in the space state. When the network signals a condition by interrupting the current in the loop, the interruption is represented by a drop in the voltage at terminal 74, so the DSR signal 150 goes into the mark state. One skilled in the art will see that this allows the computer to monitor the state of the telephone network.

For some telephone loops, the network signals by reversing the polarity of the Tip 1 and Ring 2 signals. For many telephone devices this results in reversal of the loop current. In the interface device no such reversal occurs because diode D10 blocks reverse DC loop current. Thus, under this reversal condition, no current flows in the LEDs of optoisolator U5, and the polarity reversal appears to the computer as a current interruption. Without diode D10 this would not be the case.

The high speed operation of the optical switch U4 allows the interface device to perform functions not possible with mechanical switches. For example, audible signals can be generated by appropriately pulsing the TD signal. In the call forwarding scenario described above, audible signals could be useful to indicate to the caller that a call is being processed. Further, appropriate use of pulse modulation allows the generation of dual tone, multi-frequency (DTMF) signals and voice messages.

Referring now to FIG. 4, a methodology for generating a signal necessary to produce an audible tone is shown. Although, the method can be implemented in hardware, software is the preferred implementation. One of ordinary skill in the art will recognize that a low pass filter might be necessary in conjunction with optical switch U4 to produce an audible signal of a desired quality. The output signal 101 comprises a byte of digital data that is produced by the feedback loop which includes an accumulator 102, feedback 103, an adder 104 and a switch SW 105. The byte of data comprising output signal 101 can be substituted for the data byte shown in the bottom part of FIG. 2. The output signal 101 together with start and stop bits is transmitted through the TD signal to the optical switch and to the telephone line. As such, after low pass filtering the optical switch's output signal if necessary, an audible tone will be generated over the telephone line.

The presence of start and stops bits complicates the generation of pulse modulation signals. Start and stop bits are required for proper communications through a computer's serial port. In FIG. 4 a byte sequence corresponding to a prototype time function x is generated preferably by software. The prototype function x is the desired output signal (after low pass filtering). Because the byte sequence can be generated and stored, this system need not operate in real time, but each time-step corresponds to one bit-time of the transmitted signal.

At time-step number n, the input to this system is value $x_n$ of the prototype signal at the corresponding time. At each time step the quantity $y'_n = a y_n + b$, where a and b are scale and level adjustment constants and $y_n$ is a pulse modulated output signal, is subtracted from the input signal. The difference $x_n - y'_n$ also is added to the current value in the accumulator. Switch SW 105 selects one of three values for the output signal $y_n$. If the current time-step corresponds to a start bit of the transmitted signal, $y_n = 0$. If the time-step corresponds to a data bit, the value D used is the complement of the sign of the value in the accumulator. By this we mean that $y_n = 0$ if the value in the accumulator is negative, and $y_n = 1$ otherwise. Finally, if the time-step corresponds to a stop bit, $y_n = 1$. Output data bits not including start and stop bits are shifted into a shift register SR. When eight data bits have shifted into shift register SR, the eight bit value (byte) is taken as the next byte to be sent to the computer's serial port for transmission to the interface device. Thus, the system of FIG. 4 operates as a delta-sigma modulator with a one-bit quantitizer, except that the start and stop bits are forced to have predetermined values. The feedback arrangement property accounts for these forced values, so that the output stream correctly corresponds to the input prototype function except for noise, including signal components due to the start and stop bits. The accumulator, which is clocked once for every time step, introduces a one time-step delay.

This description has been based on a simple first-order delta-sigma modulator. One of ordinary skill in the art will recognize that other arrangements can be derived from other forms of delta-sigma modulators by suitably including a switch such as switch SW 105 to select appropriately the data values and the values corresponding to start and stop bits.

The quality of the output signal depends on the data transmission rate and the quality of the low pass filter. The data rate should be as high as possible, and low-pass filtering may be needed to attenuate high frequency components created by sampling and the presence of start and stop bits. In some cases, the telephone loop itself may provide sufficient filtering. One of ordinary skill in the art will recognize that it may be necessary to replace resistor R12 with a circuit whose impedance becomes large at high frequencies.

Currently, the Caller ID telephone service does not transmit the caller identification information to a party who is using a telephone and has the Call Waiting service. With Call Waiting a party receives and audible signal while on the telephone alerting the party of an incoming call. With both the Caller ID and Call Waiting services, a party still receives an audible signal, but not the caller's identification information. If the Caller ID service, however, were to transmit identification information to a party that has the Call Waiting service and is currently using the telephone, the present invention would be able to decode the telephone line signal to extract the identification information for transmission to the computer. As such, a party presently talking on a telephone could be notified by the computer of the name and telephone number of incoming call.

Those of ordinary skill in the art will recognize that since the Dial Circuit 60 operates only when the RTS signal 140 is at a positive voltage level (Dial Mode), the TD signal 110 and the RD signal 130 can be used for conventional serial communication with other devices when the RTS signal at low or negative voltage level (Call Receive Mode). If the output impedance of comparator U2 is sufficiently high when both the RTS and the DTR signals are low or negative, holding these two signals low allows bidirectional communications through the TD and RD signals.

Numerous variations and modifications will become apparent to those skilled in the art once the above disclosure is fully appreciated. It is intended that the following claims be interpreted to embrace all such variations and modifications.

What is claimed is:

1. A computer interface device for connecting a telephone line to a computer serial RS-232 interface port, said computer and said computer interface device comprising:

a power supply circuit that derives operational power exclusively from a constant voltage level from said serial interface port;

a telephone interface circuit for isolating and protecting said computer interface device;

a ring indicator and line isolator circuit for further isolating said telephone line from said computer interface and for detecting the presence of a telephone ring signal on said telephone line, said ring detector circuit generating a ring detection signal indicative of said telephone ring signal;

a caller identification and ring detector circuit for generating output signals indicative of the presence of said telephone ring signal and also indicative of information encoded on said telephone line;

an RS-232 interface circuit for providing compatibility between said computer interface device signals and said serial RS-232 interface port, said serial RS-232 interface port includes a received line signal detect (RLSD) input pin and said interface device provides an output signal indicative of said telephone ring signal to said RLSD input pin;

a dial circuit for transmitting information from said computer to said telephone line; and a detector circuit responsive to telephone line loop current.

2. The computer interface device of claim 1 wherein said information encoded on said telephone line comprises the calling party's name.

3. The computer interface device of claim 1 wherein said information encoded on said telephone line comprises the calling party's telephone number.

4. The computer interface device of claim 3 wherein said serial RS-232 interface port supplies said constant voltage level to said computer interface device over said serial RS-232 interface port's transmit data (TD) and ready to send (RTS) and data terminal ready (DTR) pins.

5. The computer interface device of claim 1 wherein said computer controls switching between said call receiver and dial circuits.

6. The computer interface device of claim 5 wherein said computer switches operation of said computer interface device between said call receiver and said dial circuits by commanding said computer serial interface port's TD and RTS pins to reverse polarity.

7. A computer interface device for coupling a telephone line to an RS-232 serial port of a computer, comprising:
- a telephone interface circuit that isolates and protects said computer interface device;
- a caller identification circuit coupled to said telephone line for decoding caller identification information on said telephone line;
- a ring indicator and line isolator circuit for further isolating said telephone line from said computer interface and for detecting the presence of a telephone ring signal on said telephone line; and
- an RS-232 interface circuit for providing compatibility between said RS-232 serial port and said computer interface device, said RS-232 interface circuit providing an input signal indicative of said telephone ring signal to a receive line signal detect (RLSD) input terminal of said RS-232 serial port to indicate to said computer the presence of an incoming telephone call.

8. A computer peripheral device that derives operational power exclusively from a constant voltage level generated by a computer serial port, said computer peripheral device comprising a power conditioner circuit for conditioning said constant voltage level from said computer serial port to an appropriate power state for operating said computer peripheral device and further comprising circuitry that decodes caller identification information from a telephone line signal and detects a telephone ring signal and provides an output signal indicative of said telephone ring signal to a received line signal detect (RLSD) input pin of said computer serial port.

9. The computer peripheral device of claim 8 wherein said appropriate power state includes positive 5 volts.

10. The computer peripheral device of claim 8 wherein said power conditioner comprises:
- an anode of diode connected to a first terminal of a resistor;
- a voltage regulator connected to a second terminal of said resistor; and
- a filter connected in parallel across said voltage regulator.

11. The computer peripheral device of claim 10 wherein said filter comprises a capacitor.

12. The computer peripheral device of claim 10 wherein said voltage regulator comprises a zener diode.

13. A computer interface device for connecting a telephone line to a computer, said computer interface deriving operational power exclusively from a constant voltage level generated by a computer serial port, said interface device signaling said computer via a received line signal detect (RLSD) input pin of the presence of an incoming telephone call and said interface device capable of extracting caller identification information from said telephone line and transmitting said caller identification information to said computer, said computer interface also being capable of coupling electrical signals from said computer to said telephone line and said computer interface device being sensitive to telephone line loop current.

14. The computer interface device of claim 13 wherein said electrical signals from said computer generate audible tones on said telephone line.

15. The computer interface device of claim 14 wherein said electrical signals are generated by computer software.

16. The computer interface device of claim 15 wherein said electrical signals generated by computer software are produced by a delta-sigma modulator implemented in said computer's software.

* * * * *